US012158069B2

(12) United States Patent
Khapochkin et al.

(10) Patent No.: US 12,158,069 B2
(45) Date of Patent: *Dec. 3, 2024

(54) WIDE FREQUENCY RANGE UNDERGROUND TRANSMITTER

(71) Applicant: Underground Magnetics, Inc., Johnston, IA (US)

(72) Inventors: Yuriy Khapochkin, Johnston, IA (US); Dmitry Fedorov, Ankeny, IA (US)

(73) Assignee: Underground Magnetics, Inc., Johnston, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/467,833

(22) Filed: Sep. 15, 2023

(65) Prior Publication Data

US 2024/0151137 A1 May 9, 2024

Related U.S. Application Data

(63) Continuation of application No. 17/483,139, filed on Sep. 23, 2021, now Pat. No. 11,802,477.

(60) Provisional application No. 63/174,168, filed on Apr. 13, 2021.

(51) Int. Cl.
*E21B 47/13* (2012.01)
*E21B 7/04* (2006.01)
*H01Q 5/25* (2015.01)

(52) U.S. Cl.
CPC .............. *E21B 47/13* (2020.05); *E21B 7/046* (2013.01); *H01Q 5/25* (2015.01)

(58) Field of Classification Search
CPC .......... E21B 47/12; E21B 47/13; E21B 7/046; E21B 7/267; E21B 47/024; H01Q 5/25; H01Q 5/50; H01Q 21/30; H01Q 7/08
USPC ............................................ 340/853.1–856.4
See application file for complete search history.

(56) References Cited

U.S. PATENT DOCUMENTS 2,054,424 A * 9/1936 Johnson .................. H01F 21/12 336/87
7,356,495 B2 * 4/2008 Beigl ................... G06Q 20/203 705/28
2009/0309798 A1 * 12/2009 Bittar ........................ G01V 3/28 343/720
2011/0006773 A1 * 1/2011 Bittar .................. E21B 47/0228 324/333
2011/0309948 A1 * 12/2011 Montgomery ............ G06F 1/12 340/853.1

(Continued)

*Primary Examiner* — Brian Wilson

(74) *Attorney, Agent, or Firm* — Mallory M. Henninger; Advent, LLP

(57) ABSTRACT

An underground transmitter can be configured for use with a drill head and configured for wireless communication. The underground transmitter can include a control circuitry and a multi-coil antenna assembly. The control circuitry is configured for transmitting data associated with an operation of the drill head. The multi-core antenna can include an antenna core and a plurality of distinct wire coils. The plurality of distinct wire coils can be positioned proximate (e.g., around) the antenna core, with the distinct wire coils each having a different inductance associated therewith and thereby capable of transmitting in a separate frequency range. The control circuitry can be selectably coupled with the distinct wire coils to control which of the distinct wire coils are activated and thereby generating data signals at a given time.

16 Claims, 3 Drawing Sheets

(56) References Cited

U.S. PATENT DOCUMENTS

2019/0063205 A1 * 2/2019 Omeragic ................ E21B 7/04

* cited by examiner

WIDE FREQUENCY RANGE UNDERGROUND TRANSMITTER

RELATED APPLICATIONS

This application is a continuation under 35 U.S.C. $120 of U.S. patent application Ser. No. 17/483,139, filed Sep. 23, 2021, and titled "WIDE FREQUENCY RANGE UNDERGROUND TRANSMITTER," which claims domestic priority to U.S. Provisional Application No. 63/174,168, filed on Apr. 13, 2021, and entitled "WIDE FREQUENCY RANGE UNDERGROUND TRANSMITTER." The contents of U.S. patent application Ser. No. 17/483,139 and U.S. Provisional Application No. 63/174,168 are hereby incorporated by reference thereto.

BACKGROUND

In the horizontal directional drilling (HDD) industry, the HDD machine can include a system for tracking/locating a position of the drill head thereof and for otherwise transmitting data transmission from a drill head to the HDD machine and/or another location (e.g., an operator or an owner). The locating system can incorporate an underground transmitter inside the drill head and a walk-over (e.g., above-ground) locator with radiofrequency (RF) telemetry to track the drill head. In a walk-over locator case, the locator above the ground can receive information from an underground transmitter associated with the drill head. The information can then be transmitted from the walk-over locator to the HDD machine via a RF channel.

DRAWINGS

The Detailed Description is described with reference to the accompanying figures.

DETAILED DESCRIPTION

Figure 1:
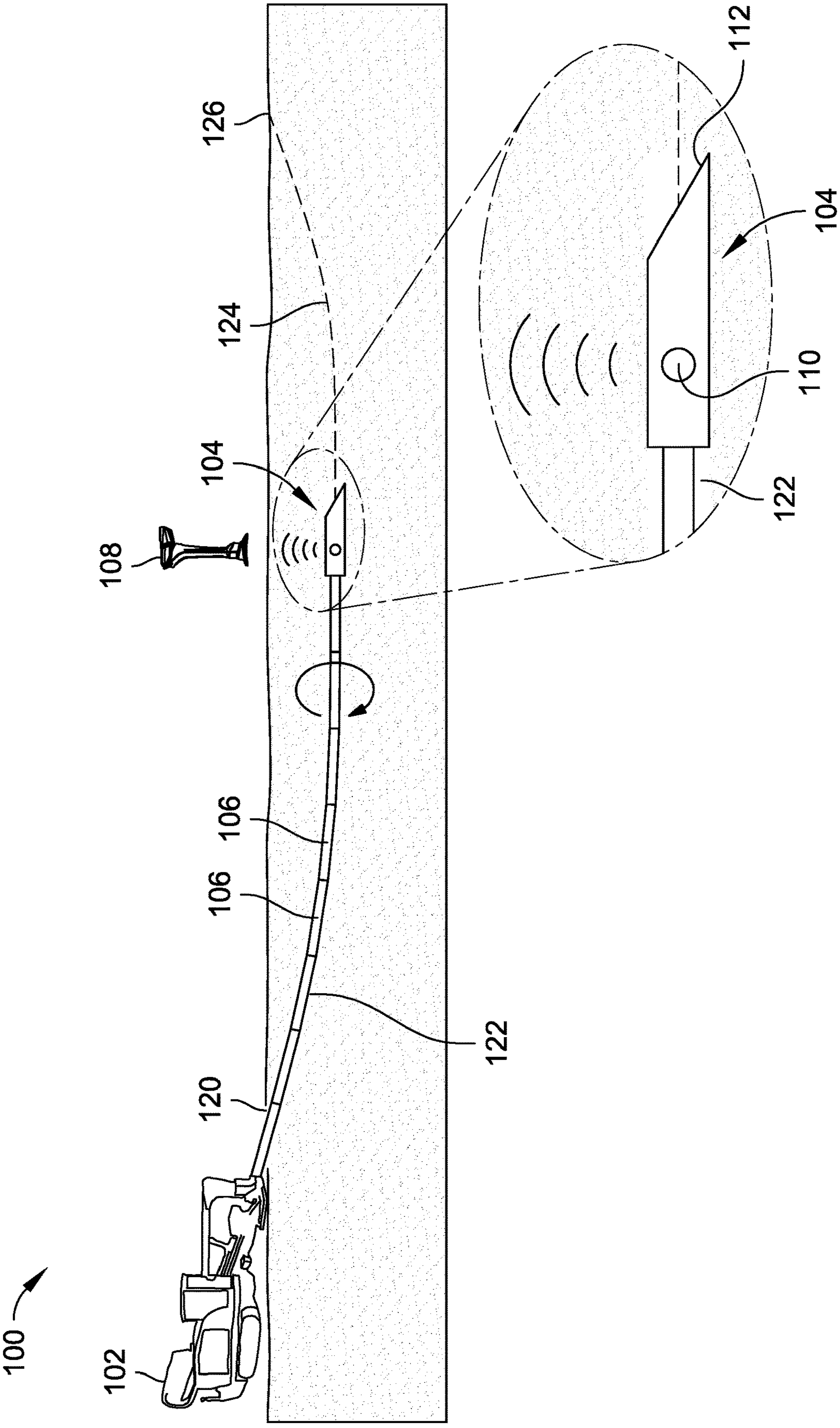
FIG. 1 is a schematic, side view of an HDD machine, in accordance with an example embodiment of the present disclosure.

Aspects of the disclosure are described more fully hereinafter with reference to the accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete and will fully convey the scope.

Overview

An underground transmitter of a locating system for an HDD locating system can transmit data and a locating dipole signal at a specific frequency for receipt by, for example, the walk-over locator and/or the HDD rig itself. In an embodiment, the locator receives data and locating dipole signal using a set of three (3) orthogonal antennas. Depending on the ambient noise level and locating environment, different frequencies may need to be used to achieve the best results in locating accuracy and/or maximum operational depth.

Modern transmitters can support multiple frequencies, but the frequency range can be limited (e.g., usually to around 10-20 different frequencies). For high passive interference locations (such as under reinforced concrete), very low frequencies (below 1 kHz) are desirable. For deep operations, higher frequencies (up to 50 kHz) are desirable. Current transmitters can cover a range 0.30-45 kHz, but not in the same device. Thus, the previously available technology has dictated a need to have two separate transmitters to cover the full frequency range optimal for different situations. It may even be necessary to change transmitters during drilling in some situations, based on those technology limits.

The present disclosure can provide an underground transmitter that can employ two or more coils, with each coil optimized for a respective set of transmission frequencies, and that is configured to switch between the use of such coils to facilitate a greater frequency range. The transmission efficiency of a given coil is directly related to the inductance thereof and transmission frequency. Inductance can be defined as the tendency of an electrical conductor to oppose a change in the electric current flowing through it.

In an embodiment, a transmitting antenna can have two or more coils wound on the same ferrite core with, for example, an inductance difference of about 8-12 times between a given pair of coils (e.g., 100 μH (micro-Henry) and 1000 μH inductance coils). A low-inductance coil can be optimized for transmitting high frequencies, such as 4-45 kHz or 4-50 kHz. A high-inductance coil can be optimized for transmitting low frequencies, such as 0.3-4 kHz. This multi-coil antenna structure can allow use of the same transmitter and its related transmitting circuit to efficiently transmit a locating signal in the whole 0.3-50 kHz frequency range.

The desired inductance may be achieved, for example, through a choice of the number of turns in the coil, the diameter of the coil, the coil length, the type of material used in the core, and/or the number of layers of winding in the coils. Solid State Opto-Relays (SSR) can be used to select the transmitting coil to be employed in a given instance. Modern solid-state relays can have a resistance in an ON state that is low enough for practical use (in the 0.1-ohm range), can require low control power (10 mW range), and can offer a high shock/vibration resistance.

In an embodiment, an underground transmitter is configured for use with a drill head and configured for wireless communication. The underground transmitter can include a control circuitry and a multi-coil antenna assembly. The control circuitry is configured for transmitting data associated with an operation of the drill head. The multi-core antenna can include an antenna core and a plurality of distinct wire coils. The plurality of distinct wire coils can be positioned proximate (e.g., around) the antenna core, with the distinct wire coils each having a different inductance associated therewith and thereby capable of transmitting in a separate frequency range. The control circuitry can be selectably coupled with the distinct wire coils to control which of the distinct wire coils are activated and thereby generating data signals at a given time.

Example Embodiments

FIG. 1 illustrates an HDD (horizontal directional drilling) system 100, in accordance with the present disclosure. In an embodiment, the HDD system 100 can include an HDD drilling rig 102, a drill head 104, a plurality of drill rods 106 (e.g., together forming a drill string), and a walk-over locator 108. The drill head 104 can be operatively coupled to and carried by an end of the drill string opposite the HDD drilling rig 102. The end of the drill string opposite the drill head can, in turn, be operatively coupled to the HDD drilling rig 102. The drill head 104 can thereby be driven and/or rotated by the HDD drilling rig 102 via the drill string. The drill head 104 can include an underground transmitter 110 and an oriented and/or slanted drill face 112. The underground transmitter 110 can register and wirelessly transmit various data associated with the operation of the drill head 104 (e.g., one or more of yaw, pitch, roll, acceleration, global positioning (e.g., via a GPS), ground temperature, ground saturation, etc., depending on the sensor capabilities associated with the drill head 104), and the oriented and/or slanted drill face 110 can facilitate the steering of the drill head 104. The operation of the HDD system 100 defines an entry point 120, a pilot bore 122, a planned drill path 124 (e.g., ahead of the existing pilot bore), and an exit point 126. The walk-over receiver or locator 108 and/or the drill rig 102 can receive the wireless signals generated by the underground transmitter 110, thereby facilitating tracking and/or monitoring of the underground drilling process.

Figure 2:
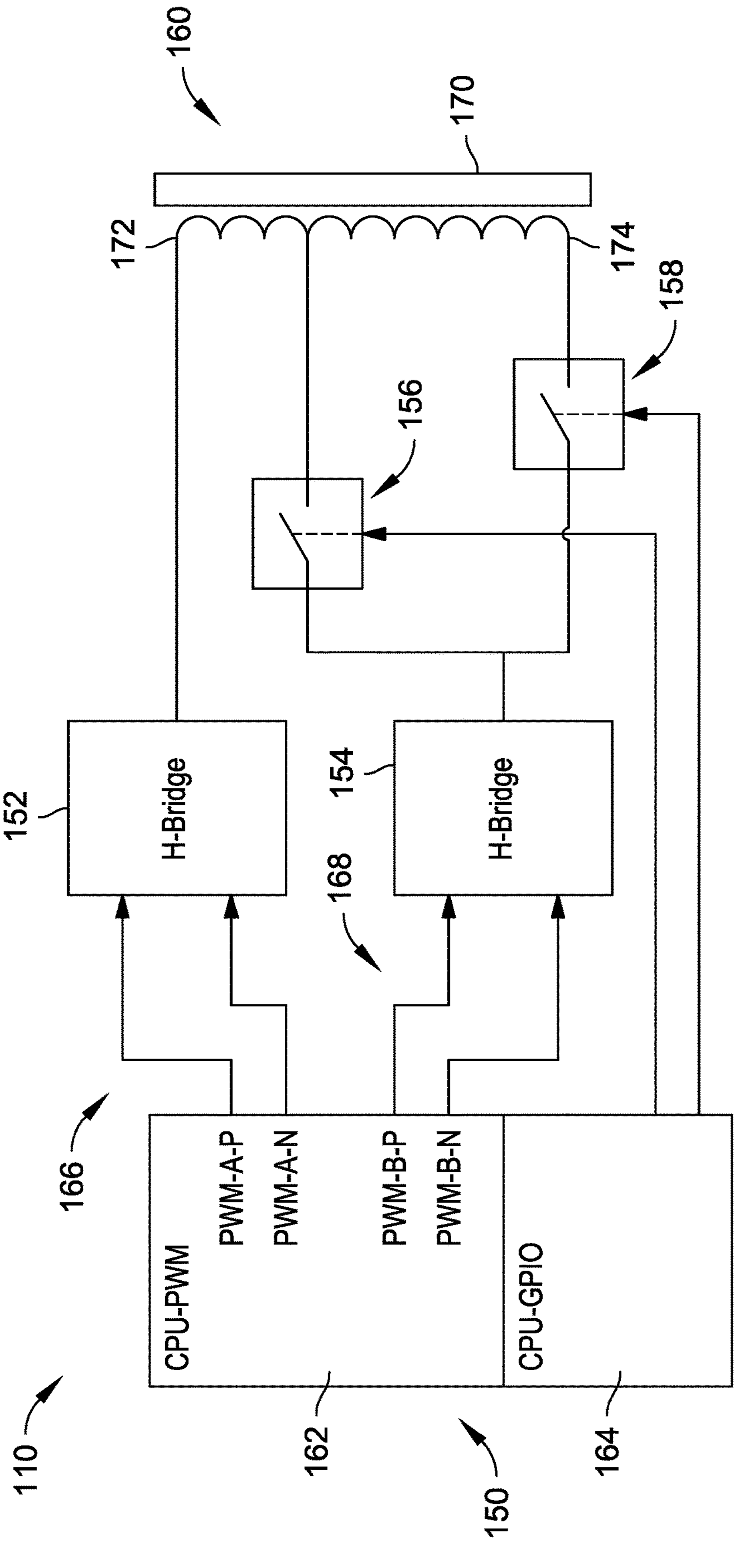
FIG. 2 is a schematic view of an underground transmitter usable, for example, with the HDD machine shown in FIG. 1, in accordance with an example embodiment of the present disclosure.

As schematically shown in FIG. 2, the underground transmitter 110 associated with the drill head 104 can include a central processing unit 150 (e.g., a transmitter controller), a first H-bridge 152, a second H-bridge 154, a first switch 156, a second switch 158, and a multi-coil antenna structure 160, operably coupled (e.g., electronically) with one another to yield a functional underground transmitter 110. The central processor unit 150 can include a pulse width modulation (PWM) controller portion 162 and a general-purpose input/output (GPIO) controller portion 164. The pulse width modulation (PWM) controller portion 162 can define an "A" circuit 166 and a "B" circuit 168. The "A" circuit 166 can be communicatively coupled with the first H-bridge 152, and the "B" circuit 168 can be communicatively coupled with the second H-bridge 154. The "A" circuit 166 can, for example, communicate a PWM A-P signal and a PWM A-N signal to the first H-bridge 152. The "B" circuit 168 can, for example, communicate a PWM B-P signal and a PWM B-N signal to the second H-bridge 154. The GPIO controller portion 164 can be separately coupled to the first switch 156 and the second switch 158 and thereby independently operate those two switches 156, 158.

The multi-coil antenna structure 160 can include an antenna core 170 (e.g., a ferrite or other magnetic core) and at least a first antenna coil 172 or a second antenna coil 174. In an embodiment, the first antenna coil 172, the second antenna coil 174, or a combination thereof can be used for transmission. In an embodiment, the first antenna coil 172 can have an inductance different from the second antenna coil 174 and thereby facilitate signal transmission in a different frequency range than its counterpart antenna coil. In an embodiment, the multi-coil antenna structure 160 can define a multi-band or wide-band antenna structure. The inductance differential can be achieved by varying, for example, one or more of the number of turns in the coil, the diameter of the coil, the type of conductor material used for the coil, the coil length, the type of material used in the core, and/or the number of layers of winding in the coils.

It is to be understood that further antenna coils may be used to accommodate additional transmission frequencies or frequency ranges. It is also to be understood that the multi-coil antenna structure 160 can be implemented as part of an underground transmitter employing different control circuitry than that shown in FIGS. 1 and/or 2 and still be within the scope of the present disclosure. For simplicity of illustration, the first and second antenna coils 172, 174 have been shown positioned proximate the antenna core 170, but it is to be understood that such coils 172, 174 can surround the antenna core 170 (e.g., wrapped therearound) to maximize their transmission capability. It is to be understood that the present multi-coil antenna structure 160 can be used in other communication structures where access to a broad range of frequencies may be desired (e.g., deep drilling) within a single system.

The operation of the first H-bridge 152, the second H-bridge 154, the first switch 156, and the second switch 158, in conjunction with the CPU 150, can ultimately control the operation of the multi-coil antenna structure 160. In an embodiment, their operation, along with that of the CPU 150, can dictate which of the first antenna coil 172 and the second antenna coil 174 is activated (e.g., transmitting a signal) at a given time. Due to the differences in induction of the first antenna coil 172 and the second antenna coil 174, the selection to activate a given one of the coils 172, 174 can determine the frequency and/or frequency range at which the multi-coil antenna structure 160 can efficiently transmit wireless signals. For example, the first antenna coil 172 may be a low-inductance coil optimized for transmitting high frequencies, such as 4-45 kHz or 4-50 kHz, and the second antenna coil 174 may be a high-inductance coil optimized for transmitting low frequencies, such as 0.3-4 kHz. For example, the second antenna coil 174 may have an inductance (e.g., 1000 μH) that is a factor of 8-12 times greater than that of the first antenna coil 172 (e.g., 100 μH). In an embodiment, the second antenna coil can have an inductance about nine (9) times greater than that of the first antenna coil 172. This multi-coil antenna structure 160 can allow using the same transmitter and transmitting circuit to efficiently transmit locating signal in the whole 0.3-50 kHz frequency range. In an embodiment, the first switch 156 and the second switch 158 can be selectably operable to activate a given one of the first antenna/wire coil 172 or the second antenna/wire coil 174.

Figure 3:
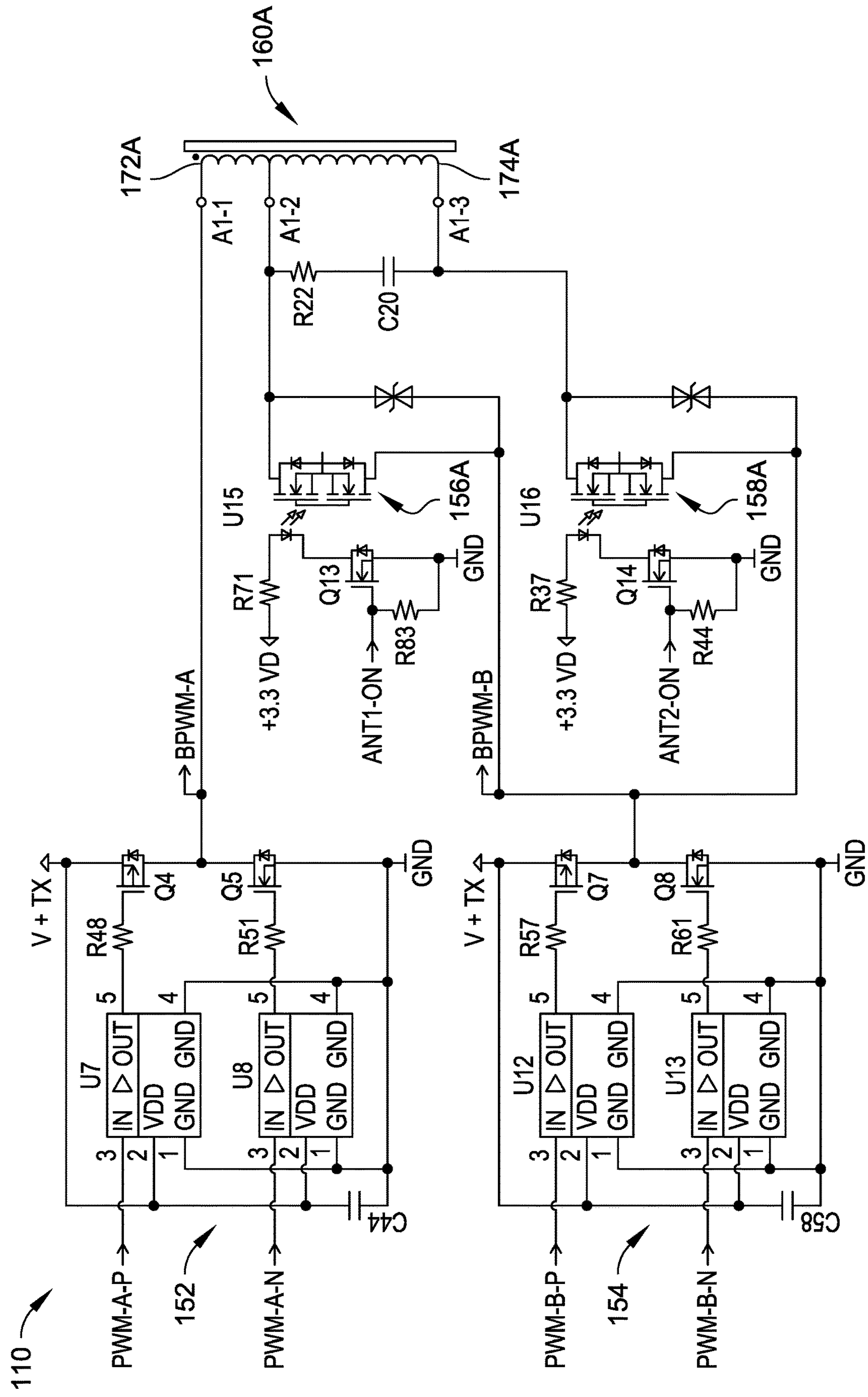
FIG. 3 is an embodiment of a circuit diagram that can be employed for the underground transmitter shown in FIG. 2.

FIG. 3 offers a circuit diagram which can be employed for the underground transmitter 110 shown in FIGS. 1 and 2. On the whole, FIG. 3 details the circuit elements (e.g., connections, resistors, switching elements, capacitors, drivers, relays, field-effect transistors (FETs), etc.) which can be used in conjunction with and/or to further define those components discussed above with respect to FIG. 2, as needed to yield an operable variant of the underground transmitter 110. However, while identified in FIG. 3, not all those circuit elements are discussed further and/or provided with specific part numbers herein, for sake of brevity.

With further respect to FIG. 3, respective solid-state opto-relays (SSR) (e.g., first and second SSR's) can be employed for (i.e., operably coupled with) the first and second switches 156A, 158A to select a given transmitting coil (e.g., first or second antenna coil 172, 174). That is, the first switch 156 can be in the form of a first SSR 156A, and the second switch 158 can be in the form of a second SSR 158A. Modern solid-state relays can have a resistance in their ON state low enough for practical use (in the 0.1-ohm range), can require low control power (10 mW (milliwatt) range), and can have high shock/vibration resistance. Thus, such SSR's are generally well adapted to use as part of an underground transmitter 110, which can rely on battery power (e.g., lower power consumption can extend battery life) and can be subject to significant shock and/or vibration, given its proximity to the drill head 104.

In further respect to FIG. 3, the central processor unit 150 (i.e., main transmitter processor) can generate PWM signals PWM-A-P, PWM-A-N, PWM-B-P, and PWM-B-N.

Drivers U7, U8, U12, U13 can control power FETs Q4, Q5, Q7, and Q8 in an H-Bridge configuration (152, 154), generating a powerful PWM signal to the main transmitting antenna (e.g., multi-coil antenna structure 160A). The central processor unit 150 can generate antenna select signals ANT1-ON, ANT2-ON to control FETs Q13, Q14 to control input LEDs of Solid State Opto-Relays U15 and U16 (i.e., switches 156A, 158A) to connect either the low inductance coil 172A (from A1-1 to A1-2) or the high inductance coil 174A (from A1-1 to A1-3) to an H-Bridge output (e.g., from one of 152, 154).

The HDD system 100 may be controlled by one or more computing systems having a processor configured to execute computer readable program instructions (i.e., the control logic) from a non-transitory carrier medium (e.g., storage medium such as a flash drive, hard disk drive, solid-state disk drive, SD card, optical disk, or the like). The computing system can be connected to various components of the HDD system 100, either by direct connection, or through one or more network connections (e.g., local area networking (LAN), wireless area networking (WAN or WLAN), one or more hub connections (e.g., USB hubs), and so forth). For example, the computing system can be communicatively coupled (e.g., hard-wired or wirelessly) to the controllable elements (e.g., HDD system 100). The program instructions, when executing by the processor, can cause the computing system to control the HDD system 100. In an implementation, the program instructions form at least a portion of software programs for execution by the processor.

The processor provides processing functionality for the computing system and may include any number of processors, micro-controllers, or other processing systems, and resident or external memory for storing data and other information accessed or generated by the computing system. The processor is not limited by the materials from which it is formed or the processing mechanisms employed therein and, as such, may be implemented via semiconductor(s) and/or transistors (e.g., electronic integrated circuits (ICs)), and so forth.

The non-transitory carrier medium is an example of device-readable storage media that provides storage functionality to store various data associated with the operation of the computing system, such as a software program, code segments, or program instructions, or other data to instruct the processor and other elements of the computing system to perform the techniques described herein. The carrier medium may be integral with the processor, stand-alone memory, or a combination of both. The carrier medium may include, for example, removable and non-removable memory elements such as RAM, ROM, Flash (e.g., SD Card, mini-SD card, micro-SD Card), magnetic, optical, USB memory devices, and so forth. In embodiments of the computing system, the carrier medium may include removable ICC (Integrated Circuit Card) memory such as provided by SIM (Subscriber Identity Module) cards, USIM (Universal Subscriber Identity Module) cards, UICC (Universal Integrated Circuit Cards), and so on.

The computing system can include one or more displays to display information to a user of the computing system. In embodiments, the display may comprise an LED (Light Emitting Diode) display, an OLED (Organic LED) display, an LCD (Liquid Crystal Diode) display, a TFT (Thin Film Transistor) LCD display, an LEP (Light Emitting Polymer), or PLED (Polymer Light Emitting Diode) display, and so forth, configured to display text and/or graphical information such as a graphical user interface. The display may be backlit via a backlight such that it may be viewed in the dark or other low-light environments. The display may be provided with a touch screen to receive input (e.g., data, commands, etc.) from a user. For example, a user may operate the computing system by touching the touch screen and/or by performing gestures on the touch screen. In some embodiments, the touch screen may be a capacitive touch screen, a resistive touch screen, an infrared touch screen, combinations thereof, and the like. The computing system may further include one or more input/output (I/O) devices (e.g., a keypad, buttons, a wireless input device, a thumbwheel input device, a track-stick input device, and so on). The I/O devices may include one or more audio I/O devices, such as a microphone, speakers, and so on.

The computing system may also include a communication module representative of communication functionality to permit computing device to send/receive data between different devices (e.g., components/peripherals) and/or over the one or more networks. The communication module may be representative of a variety of communication components and functionality including, but not necessarily limited to: a browser; a transmitter and/or receiver; data ports; software interfaces and drivers; networking interfaces; data processing components; and so forth.

The one or more networks are representative of a variety of different communication pathways and network connections which may be employed, individually or in combinations, to communicate among the components of the HDD system 100. Thus, the one or more networks may be representative of communication pathways achieved using a single network or multiple networks. Further, the one or more networks are representative of a variety of different types of networks and connections that are contemplated including, but not necessarily limited to: the Internet; an intranet; a Personal Area Network (PAN); a Local Area Network (LAN) (e.g., Ethernet); a Wide Area Network (WAN); a satellite network; a cellular network; a mobile data network; wired and/or wireless connections; and so forth. Examples of wireless networks include but are not necessarily limited to: networks configured for communications according to: one or more standard of the Institute of Electrical and Electronics Engineers (IEEE), such as 802.11 or 802.16 (Wi-Max) standards; Wi-Fi standards promulgated by the Wi-Fi Alliance; Bluetooth standards promulgated by the Bluetooth Special Interest Group; and so on. Wired communications are also contemplated such as through Universal Serial Bus (USB), Ethernet, serial connections, and so forth.

The computing system is described as including a user interface, which is storable in memory (e.g., the carrier medium) and executable by the processor. The user interface is representative of functionality to control the display of information and data to the user of the computing system via the display. In some implementations, the display may not be integrated into the computing system and may instead be connected externally using universal serial bus (USB), Ethernet, serial connections, and so forth. The user interface may provide functionality to allow the user to interact with one or more applications of the computing system by providing inputs (e.g., sample identities, desired dilution factors, standard identities, eluent identities/locations, fluid addition flow rates, etc.) via the touch screen and/or the I/O devices. For example, the user interface may cause an application programming interface (API) to be generated to configure the application for display by the display or in combination with another display. In embodiments, the API may further expose functionality to configure the HDD system 100 to allow the user to interact with an application by providing inputs via the touch screen and/or the I/O devices.

In implementations, the user interface may include a browser (e.g., for implementing functionality of the inline dilution control module). The browser enables the computing device to display and interact with content such as a webpage within the World Wide Web, a webpage provided by a web server in a private network, and so forth. The browser may be configured in a variety of ways. For example, the browser may be configured to be accessed by the user interface. The browser may be a web browser suitable for use by a full resource device with substantial memory and processor resources (e.g., a smart phone, a personal digital assistant (PDA), etc.).

Generally, any of the functions described herein can be implemented using software, firmware, hardware (e.g., fixed logic circuitry), manual processing, or a combination of these implementations. The terms “module” and “functionality” as used herein generally represent software, firmware, hardware, or a combination thereof. The communication between modules in the HDD system 100, for example, can be wired, wireless, or some combination thereof. In the case of a software implementation, for instance, a module may represent executable instructions that perform specified tasks when executed on a processor, such as the processor described herein. The program code can be stored in one or more device-readable storage media, an example of which is the non-transitory carrier medium associated with the computing system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A horizontal directional drilling (HDD) system, comprising:
- an HDD drilling rig;
- a plurality of drill rods coupled together to form a drill string, the drill string operatively coupled to the HDD drilling rig; and
- a drill head carried by an end of the drill string opposite the HDD drilling rig, the drill head including an underground transmitter, the underground transmitter configured for wireless communication, the underground transmitter including:
  - a control circuitry for transmitting data associated with an operation of the drill head, the control circuitry including:
    - a first switch connected to a first wire coil of a plurality of distinct wire coils, the first switch operable via an optical signal receivable from a first light emitting diode, and
    - a second switch connected to a second wire coil of the plurality of distinct wire coils, the second switch operable via an optical signal from a second light emitting diode; and
- a multi-coil antenna assembly including:
  - an antenna core, and
  - the plurality of distinct wire coils positioned proximate the antenna core, each one of the plurality of distinct wire coils having a different inductance associated therewith and thereby capable of transmitting in a separate frequency range, the control circuitry coupled with the plurality of distinct wire coils to control which of the plurality of distinct wire coils is activated and thereby generating data signals at a given time by selectably actuating one or the other of the first light emitting diode or the second light emitting diode.

2. The HDD system of claim 1, wherein the underground transmitter is configured to register and wirelessly transmit one or more forms of data associated with the operation of the drill head.

3. The HDD system of claim 1, wherein the multi-coil antenna assembly defines a wide-band antenna structure.

4. The HDD system of claim 1, wherein the first wire coil of the plurality of distinct wire coils has a first inductance associated therewith, and the second wire coil of the plurality of distinct wire coils has a second inductance associated therewith, the second inductance being greater than that of the first inductance.

5. The HDD system of claim 4, wherein the first wire coil is configured for transmitting frequencies in a range of 4-50 kHz, and the second wire coil is configured for transmitting frequencies in a range of 0.3-4 kHz.

6. The HDD system of claim 1, wherein at least one of the first switch or the second switch is in the form of a solid-state relay (SSR).

7. The HDD system of claim 1, wherein the control circuitry further includes a processor, a first H-bridge, and a second H-bridge, the processor operatively coupled to the first H-bridge and the second H-bridge, the first H-bridge operatively coupled to the multi-coil antenna assembly, the second H-bridge operatively coupled to both the first switch and the second switch.

8. An underground transmitter configured for use with a drill head, the underground transmitter configured for wireless communication, the underground transmitter comprising:
- a control circuitry for transmitting data associated with an operation of the drill head, the control circuitry including:
  - a first switch connected to a first wire coil of a plurality of distinct wire coils, the first switch operable via an optical signal receivable from a first light emitting diode, and
  - a second switch connected to a second wire coil of the plurality of distinct wire coils, the second switch operable via an optical signal from a second light emitting diode; and
- a multi-coil antenna assembly including:
  - an antenna core, and
  - the plurality of distinct wire coils positioned proximate the antenna core, each one of the plurality of distinct wire coils having a different inductance associated therewith and thereby capable of transmitting in a separate frequency range, the control circuitry coupled with the plurality of distinct wire coils to control which of the plurality of distinct wire coils is activated and thereby generating data signals at a given time by selectably actuating one or the other of the first light emitting diode or the second light emitting diode.

9. The underground transmitter of claim 8, wherein the multi-coil antenna assembly defines a wide-band antenna structure.

10. The underground transmitter of claim 8, wherein the first wire coil of the plurality of distinct wire coils has a first inductance associated therewith, and the second wire coil of the plurality of distinct wire coils has a second inductance associated therewith, the second inductance being greater than that of the first inductance.

11. The underground transmitter of claim 10, wherein the second inductance is at least a factor of eight (8) times greater than that of the first inductance.

12. The underground transmitter of claim 10, wherein the first wire coil with the first inductance is configured for transmitting at high frequencies, and the second wire coil with the second inductance is configured for transmitting at low frequencies.

13. The underground transmitter of claim 12, wherein the first wire coil is configured for transmitting frequencies in a range of 4-50 kHz, and the second wire coil is configured for transmitting frequencies in a range of 0.3-4 kHz.

14. The underground transmitter of claim 8, wherein at least one of the first switch or the second switch is in the form of a solid-state relay (SSR).

15. The underground transmitter of claim 8, wherein the control circuitry further includes a processor, a first H-bridge, and a second H-bridge, the processor operatively coupled to the first H-bridge and the second H-bridge, the first H-bridge operatively coupled to the multi-coil antenna assembly, the second H-bridge operatively coupled to both the first switch and the second switch.

16. The underground transmitter of claim 8, wherein the underground transmitter is configured to be used as part of a horizontal directional drilling system.

* * * * *